United States Patent
Goto et al.

(10) Patent No.: US 8,897,918 B2
(45) Date of Patent: Nov. 25, 2014

(54) ROBOT HAND AND ROBOT

(75) Inventors: Yoshinobu Goto, Chino (JP); Kenjiro Murakami, Matsumoto (JP); Kazuto Yoshimura, Suwa (JP)

(73) Assignee: Seiko Epson Corporation (JP)

( * ) Notice: Subject to any disclaimer, the term of this patent is extended or adjusted under 35 U.S.C. 154(b) by 379 days.

(21) Appl. No.: 13/467,547

(22) Filed: May 9, 2012

(65) Prior Publication Data

US 2012/0290133 A1   Nov. 15, 2012

(30) Foreign Application Priority Data

May 10, 2011   (JP) ................................. 2011-105007

(51) Int. Cl.
*B25J 13/08*   (2006.01)
*B25J 15/02*   (2006.01)
*B25J 9/16*   (2006.01)
*B25J 15/10*   (2006.01)

(52) U.S. Cl.
CPC .............. *B25J 15/10* (2013.01); *B25J 15/0253* (2013.01); *B25J 9/1612* (2013.01); *Y10S 901/33* (2013.01); *Y10S 901/34* (2013.01); *Y10S 901/31* (2013.01)
USPC .............. 700/253; 700/260; 901/33; 901/34; 901/31

(58) Field of Classification Search
CPC .... B23P 19/007; B65G 47/90; B65G 47/905; B65G 47/917; B25J 13/08; B25J 13/081; B25J 13/084; B25J 13/085; B25J 15/0253; B25J 15/026; B25J 15/0266; B25J 15/0273; B25J 15/028; B25J 15/0286; B25J 15/0293; B25J 9/1612; B25J 15/10; B25J 15/106; G01L 5/226; G01L 5/228
USPC ............ 700/245, 253, 254, 255, 260; 901/31, 901/33, 34
See application file for complete search history.

(56) References Cited

U.S. PATENT DOCUMENTS

| | | | |
|---|---|---|---|
| 4,561,825 A * | 12/1985 | Sakata | 414/753.1 |
| 4,579,380 A * | 4/1986 | Zaremsky et al. | 294/119.1 |
| 4,715,773 A * | 12/1987 | Parker et al. | 414/730 |
| 4,872,803 A * | 10/1989 | Asakawa | 414/730 |
| 5,012,591 A * | 5/1991 | Asakawa | 33/832 |
| 7,707,001 B2 | 4/2010 | Obinata et al. | |
| 2009/0069942 A1 | 3/2009 | Takahashi | |

FOREIGN PATENT DOCUMENTS

| | | |
|---|---|---|
| JP | 2-94096 | 7/1990 |
| JP | 2002-355785 | 12/2002 |
| JP | 2005-143961 | 6/2005 |
| JP | 2005-257343 | 9/2005 |
| JP | 2009-066685 | 4/2009 |
| JP | 2010-149262 | 7/2010 |

\* cited by examiner

*Primary Examiner* — Khoi Tran
*Assistant Examiner* — Adam Mott
(74) *Attorney, Agent, or Firm* — Harness, Dickey & Pierce, P.L.C.

(57) ABSTRACT

A robot hand has a plurality of fingers including a contact sensing finger that senses contact with an object. A base provided with the fingers detects a resultant reaction force that is the combination of reaction forces from the fingers. When no resultant reaction force is detected, the plurality of fingers are moved toward the object, and when the contact sensing finger comes into contact with the object, a force that drives the fingers is switched to a force corresponding to a grasp force. When the contact sensing finger has not come into contact with the object but a resultant reaction force is detected, the driving of the fingers is terminated and the position of the base is corrected by moving the base in a direction in which the resultant reaction force having acted thereon is not detected any more.

5 Claims, 8 Drawing Sheets

ROBOT HAND AND ROBOT

BACKGROUND

1. Technical Field

The present invention relates to a robot hand that grasps an object by using a plurality of fingers and a robot.

2. Related Art

Robots are widely used in manufacturing involving welding and painting. Further, robot hands having a plurality of fingers capable of grasping an object have been developed, which allow robots to also be used for carrying, assembling, and otherwise handling a variety of parts.

A robot hand needs to grasp an object with a force of an appropriate magnitude that does not damage the object to be grasped. Further, a robot hand is desired to be able to move fingers as quick as possible when grasping an object from a viewpoint of increased productivity.

To simultaneously meet the requirements described above, the following technology has been proposed (see JP-A-2009-066685). First, fingers of a robot hand are driven under position control to approach a target position in the immediate vicinity of an object. The fingers of the robot hand are then allowed to come into contact with the object under position control while limiting their grasp force to an acceptable predetermined value (position control with force constraint). Thereafter, the object is grasped with a force of an appropriate magnitude under force control. The proposed technology allows the fingers of the robot hand to approach an object quickly under the position control and then grasp the object with a force of an appropriate magnitude under the force control. The series of events described above, driving the fingers of the robot hand to approach the object, allowing the fingers to come into contact with the object, and then allowing the fingers to grasp the object with a force of an appropriate magnitude, can smoothly proceed under the position control with force constraint.

The technology described in JP-A-2009-066685, however, requires each finger that comes into contact with an object to be provided with a contact sensor. Further, before the fingers of the robot hand come into contact with the object, the control needs to be switched from the position control to the position control with force constraint and then to the force control. This is problematic because the structure and control of the robot hand (or robot) are inevitably complicated.

SUMMARY

An advantage of some aspects of the invention is to provide a robot hand or a robot that is simply configured, readily controlled, and capable of quickly grasping an object with a force of an appropriate magnitude.

An aspect of the invention is directed to a robot hand that includes a plurality of fingers and a base provided with the plurality of fingers and grasps an object by using the plurality of fingers, the robot hand including: a resultant reaction force detector that detects a resultant reaction force that is a combination of reaction forces exerted by the plurality of fingers on the base, and a finger driver that drives the plurality of fingers to approach the object or move away from the object, wherein the plurality of fingers include a contact sensing finger that senses contact with the object, and the finger driver moves the plurality of fingers toward the object when the resultant reaction force is not detected and the contact sensing finger does not sense the contact, and switches a force that drives the plurality of fingers to a force corresponding to a grasp force exerted to grasp the object when the contact sensing finger senses the contact, wherein, when the contact sensing finger does not sense the contact but the resultant reaction force is detected, the driving of the plurality of fingers is stopped, the position of the base is changed by moving the base in a direction the resultant reaction force is not detected any more, and the plurality of fingers are again moved toward the object.

In the thus configured robot hand according to the aspect of the invention, the plurality of fingers includes a contact sensing finger that comes into contact with an object and senses the contact. The contact sensing finger typically comes into contact with the object before any of the other fingers. When any of the plurality of fingers comes into contact with the object, a reaction force from the object is transmitted to the base and detected as a resultant reaction force. When no resultant reaction force is detected, the plurality of fingers are moved toward the object. In this process, for example, the fingers can be driven so that they approach a target position set with respect to the object. When the contact sensing finger comes into contact with the object, a force that drives the plurality of fingers is switched to a force corresponding to a grasp force exerted to grasp the object. The "force corresponding to a grasp force exerted to grasp the object" used herein is a force that drives the fingers and causes the fingers to be pressed against the object at the magnitude of the grasp force. When the contact sensing finger has not come into contact with the object but a resultant reaction force has been detected, the operation of driving the plurality of fingers is terminated, the position of the base is changed by moving the base in a direction in which the resultant reaction force having acted thereon is not detected any more, and the plurality of fingers are again moved toward the object.

The fingers can therefore be quickly driven because the plurality of fingers simply need to be moved toward the object until the contact sensing finger comes into contact with the object. When the contact sensing finger comes into contact with the object, the magnitude of the force that drives the plurality of fingers is changed so that the object can be grasped with a grasp force of an appropriate magnitude. Further, since the plurality of fingers simply need to approach the object or move away therefrom, the fingers can be driven with a simple mechanism, whereby the structure of the robot hand can be simplified. Moreover, since a method for driving the fingers simply needs to be changed when the contact sensing finger comes into contact with the object, the control of the robot hand can also be simplified. In addition, when the base of the robot hand is not properly positioned relative to the object and hence one of the fingers comes into contact with the object before the contact sensing finger does, a resultant reaction force is detected but the contact sensing finger does not send a signal indicating that has come into contact with the object. It is therefore determined that the base of the robot hand is not properly positioned relative to the object, and the position of the base can be corrected. As a result, even when the robot hand, which has a simple structure and can be readily controlled, is not properly positioned relative to the object, the position of the robot hand can be corrected so that the robot hand can appropriately grasp the object.

In the robot hand according to the aspect of the invention described above, the contact sensing finger may be configured as follows. The contact sensing finger may deform when a reaction force that is smaller than the grasp force used to exert the object is exerted thereon by the object.

The thus configured contact sensing finger will not be pressed against the object with a force greater than forces exerted from the other fingers or will not damage the object.

Further, the robot hand according to the aspect of the invention described above, which has a simple structure, can be readily controlled, and can quickly grasp an object with a grasp force of an appropriate magnitude, is particularly suitable to be incorporated in a robot.

BRIEF DESCRIPTION OF THE DRAWINGS

The invention will be described with reference to the accompanying drawings, wherein like numbers reference like elements.

DESCRIPTION OF EXEMPLARY EMBODIMENTS

To clarify the contents of the present invention described above, an embodiment will be described below in the following order.

Figure 1A:
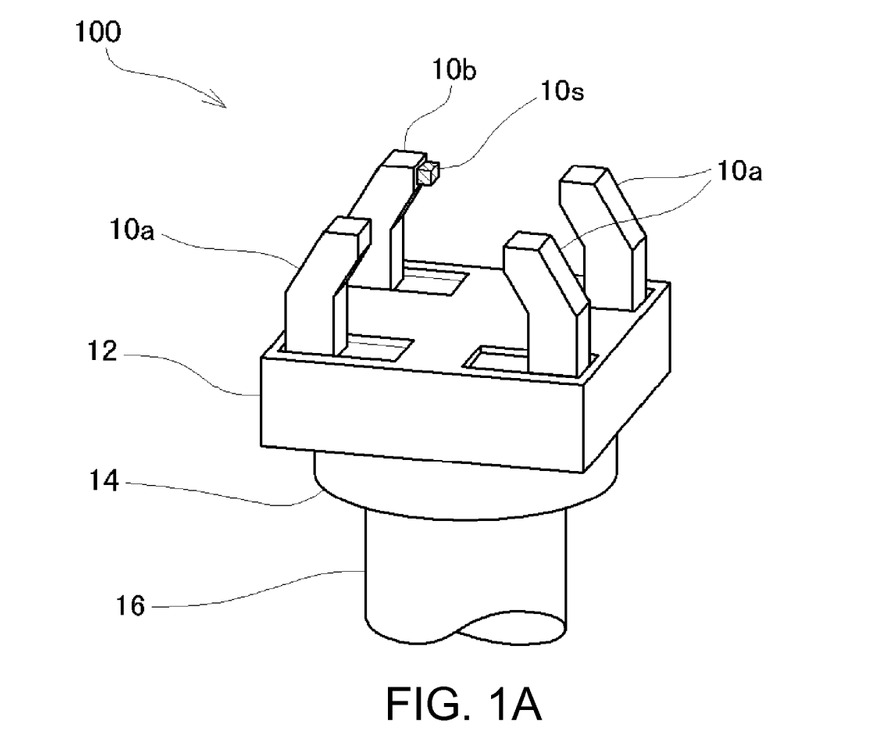
FIGS. 1A and 1B are descriptive diagrams showing a general structure of a robot hand according to an embodiment.
Figure 1B:
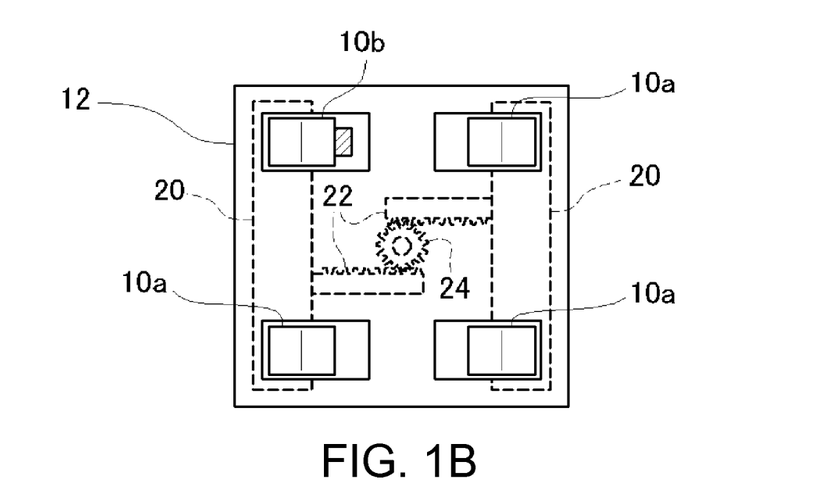

A: Structure of robot hand according to present embodiment
B: Object grasp operation
C: Variations
D: Application example A: Structure of a Robot Hand According to Present Embodiment FIGS. 1A and 1B are descriptive diagrams showing a general structure of a robot hand 100 according to the present embodiment. The robot hand 100 according to the present embodiment includes four fingers 10a, 10b, a base 12 provided with the fingers, a load cell 14 attached to the base 12, and an arm 16 that supports the base 12 with the load cell 14 therebetween, as shown in FIG. 1A. The four fingers 10a, 10b form two pairs, each of which is formed of two fingers facing each other, and one of the four fingers is a contact sensing finger 10b having a contact switch 10s incorporated in a portion that comes into contact with an object to be grasped. Among the four fingers 10a, 10b, the fingers having no contact switch 10s incorporated therein are sometimes called normal fingers 10a as distinguished from the contact sensing finger 10b. When the normal fingers 10a and the contact sensing finger 10b are not necessary to be distinguished from each other, they are collectively called fingers 10 in some cases.

FIG. 1B is a top view of the robot hand 100 shown in FIG. 1A and shows a mechanism for driving the four fingers 10. The base 12 of the robot hand 100 accommodates two movable members 20, as shown in FIG. 1B. Among the four fingers 10, two fingers 10 oriented in the same direction stand from the same movable member 20. Further, each of the movable members 20 is provided with a rack gear 22, and the rack gears 22 engage with a pinion gear 24 incorporated in a central portion of the base 12. According to the configuration described above, when a drive motor (not shown) rotates the pinion gear 24, the rack-pinion mechanism moves the movable members 20 by the same distance in opposite directions. As a result, among the four fingers 10, the fingers 10 facing each other simultaneously approach each other or move away from each other by the same distance relative to an object to be grasped. In the present embodiment, the rack gears 22 and the pinion gear 24, which form the rack-pinion mechanism, and a control circuit (not shown) that controls the motion of the rack-pinion mechanism correspond to the "finger driver" in the invention.

B: Object Grasp Operation

Figure 2A:
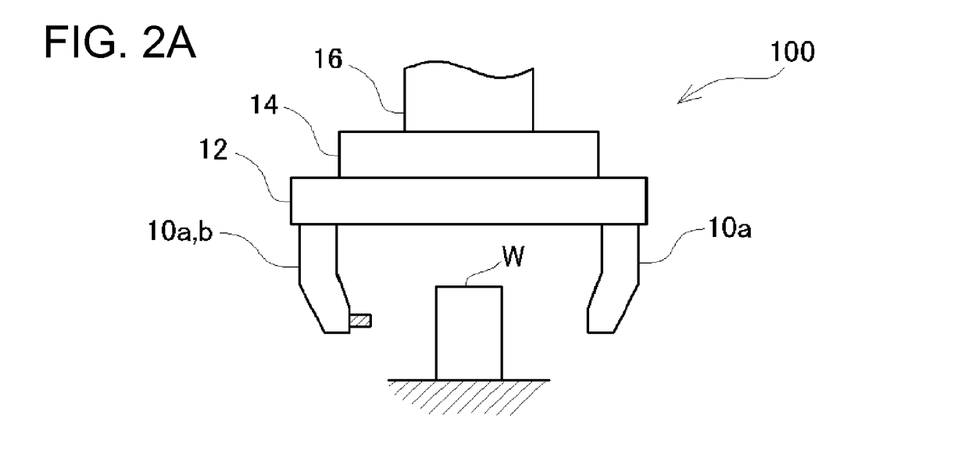
FIGS. 2A to 2C are descriptive diagrams showing how the robot hand according to the present embodiment grasps an object.
Figure 2B:
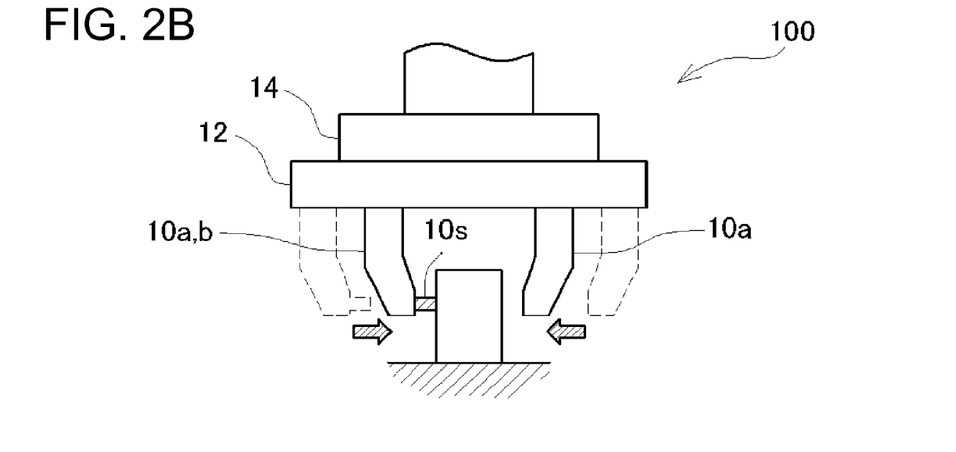
Figure 2C:
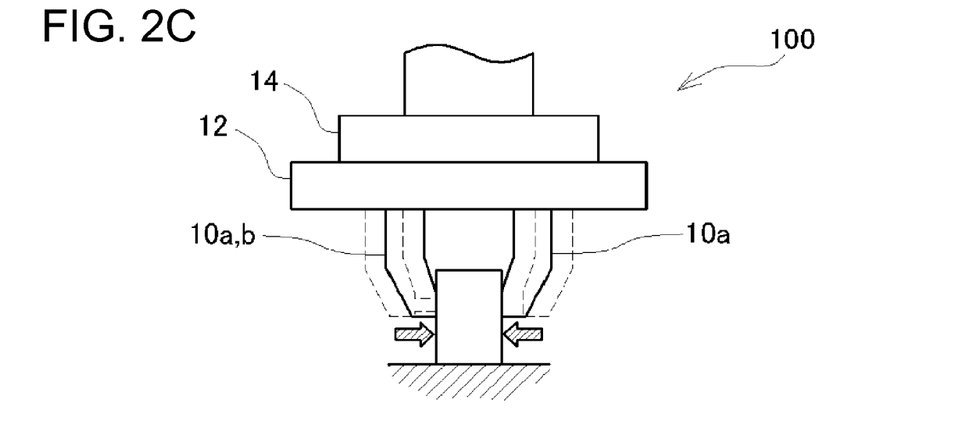

FIGS. 2A to 2C are descriptive diagrams showing how the robot hand 100 according to the present embodiment grasps an object W. Since the four fingers 10 are configured so that fingers 10 facing each other simultaneously approach each other or move away from each other by the same distance as described above, the robot hand 100 according to the present embodiment always grasps the object W in the same position with respect to the base 12 (immediately below the center of the base 12). To this end, the robot hand 100, before grasping the object W, is positioned so that the object W is located immediately below the center of the base 12. FIG. 2A shows a state in which the robot hand 100 has been properly positioned relative to the object W.

From this state, the four fingers 10 are driven to approach the object W by rotating the pinion gear 24. The fingers 10 are driven to approach the object W under position control so that they approach the object W as quickly as possible (in shortest possible time). That is, a target position to which the fingers 10 are moved is set in accordance with the size of the object W to be grasped, and the torque produced by the drive motor for driving the pinion gear 24 is controlled so that the fingers 10 reach the target position as quickly as possible. When the size of the object W to be grasped is unknown, the robot hand 100 according to the present embodiment may perform the position control based on a target position where fingers 10 facing each other become closest to each other (target position where fingers 10 grasp smallest graspable object W). The reason for this will be described later.

As the four fingers 10 approach the object W, the contact sensing finger 10b eventually comes into contact with the object W and the contact switch 10s is turned ON, as shown in FIG. 2B. The contact sensing finger 10b thus senses the contact with the object W. After the contact sensing finger 10b senses the contact, the control under which the fingers 10 are moved to the target position (position control) is switched to control under which the fingers 10 are moved with a force of a constant magnitude (force control). The magnitude of the force with which the fingers 10 are moved under the force control is set so that the object W is not damaged but grasped appropriately when the fingers 10 are pressed against the object W with the force.

As a result, after the contact sensing finger 10*b* comes into contact with the object W, the four fingers 10 are driven to slowly approach the object W (at a speed slower than the speed used until the contact sensing finger 10*b* comes into contact with the object W). At this point, the contact switch 10*s* provided in the contact sensing finger 10*b* receives a reaction force from the object W and retracts (depresses) by a distance over which the fingers 10 have approached the object W. The four fingers 10 finally come into contact with the object W and grasp the object W with a force of an appropriate magnitude, as shown in FIG. 2C.

Figure 3:
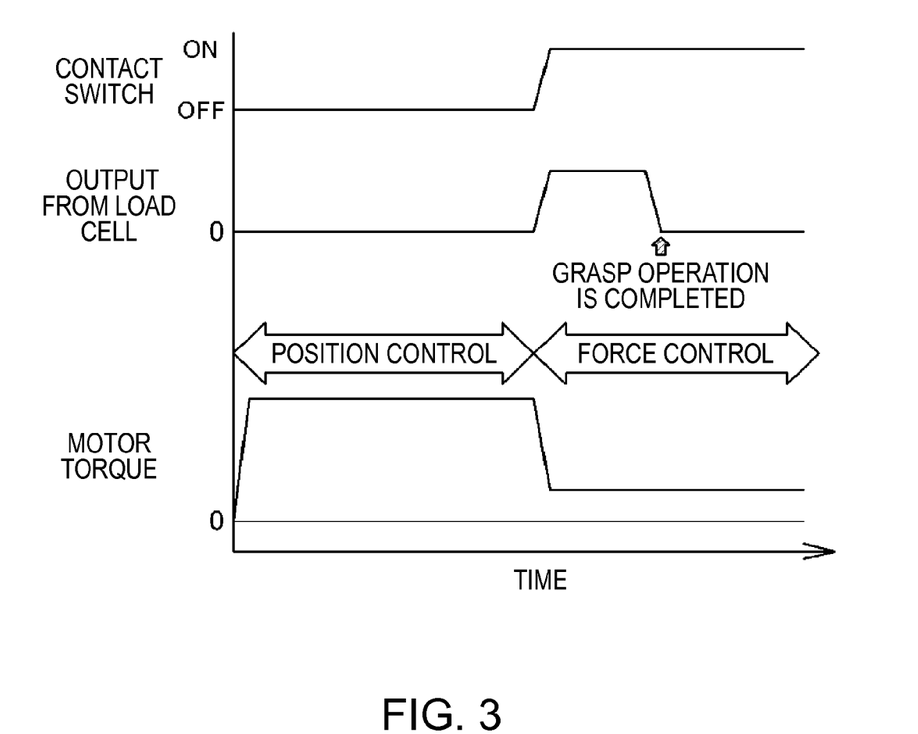
FIG. 3 is a timing chart showing how the robot hand according to the present embodiment grasps an object.

FIG. 3 is a timing chart showing how the state of the contact switch 10*s*, the output from the load cell 14, and the torque produced by the drive motor for driving the pinion gear 24 change with time in the process in which the robot hand 100 according to the present embodiment grasps the object W. Since the position control is performed immediately after the grasp operation starts as described above, the drive motor for driving the pinion gear 24 produces a large torque close to a maximum rated torque so that the fingers 10 reach the target position as quickly as possible. Thereafter, when the contact sensing finger 10*b* comes into contact with the object W as shown in FIG. 2B, and the contact switch 10*s* is turned ON, the position control is switched to the force control. In the force control, the drive motor is controlled to produce a predetermined torque that allows the fingers 10 to grasp the object W with a force of an appropriate magnitude.

Further, when the contact sensing finger 10*b* comes into contact with the object W, the reaction force received by the contact sensing finger 10*b* is transmitted to the base 12 and detected by the load cell 14. When the four fingers 10 come into contact with the object W as shown in FIG. 2C, however, reaction forces transmitted from the fingers 10 to the base 12 cancel each other, and the load cell 14 does not detect the reaction force having acted thereon any more. When the load cell 14 does not detect the reaction force having acted thereon any more, it can be determined that the object W has been successfully grasped. Since it is desirable to keep holding the object W after the object W is successfully grasped, the drive motor for driving the pinion gear 24 keeps producing a constant torque. Since a reaction force detected by the load cell 14 is a resultant reaction force that is a combination of reaction forces received by the base 12 from the four fingers 10, the reaction force detected by the load cell 14 corresponds to the "resultant reaction force" in the invention, and the load cell 14 corresponds to the "resultant reaction force detector" in the invention.

As described above, the robot hand 100 according to the present embodiment drives the fingers 10 to approach the object W quickly under position control, and when the contact sensing finger 10*b* comes into contact with the object W, switches the position control to the force control so that the fingers 10 grasp the object W with a force of an appropriate magnitude. The object W can therefore be quickly grasped with a force of an appropriate magnitude. Further, the robot hand 100 is not controlled in a complicated manner because the control is simply formed of setting the contact sensing finger 10*b* to sense contact with the object W before the other fingers 10 (that is, normal fingers 10*a*) do and switching the position control to the force control after the contact is sensed. In addition, the structure of the robot hand 100 is not complicated because only one of the four fingers 10 is provided with the contact switch 10*s*.

In the present embodiment, the control of the robot hand 100 can also be simplified in the following point. That is, since the contact sensing finger 10*b* comes into contact with the object W before the object W is grasped and the control method is switched to the force control, the control method has been already switched to the force control when the four fingers 10 grasp the object W. The object W can therefore be grasped without any damage even when the position control is performed by assuming that the object W has the smallest graspable size. The control will therefore not be at all complicated even when the size of the object W is unknown.

The above description has been made by assuming that the robot hand 100 or the object W is moved before the object W is grasped so that the robot hand 100 is properly positioned relative to the object W. The positional relationship between the robot hand 100 and the object W may, however, change for some reasons. The robot hand 100 according to the present embodiment can grasp the object W appropriately even in this case as follows.

Figure 4A:
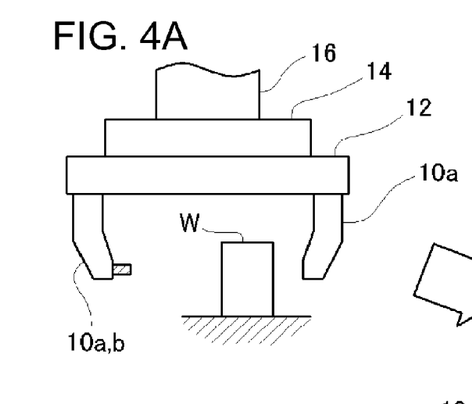
FIGS. 4A to 4E are descriptive diagrams showing how the robot hand according to the present embodiment grasps an object after the position of the hand is corrected.
Figure 4B:
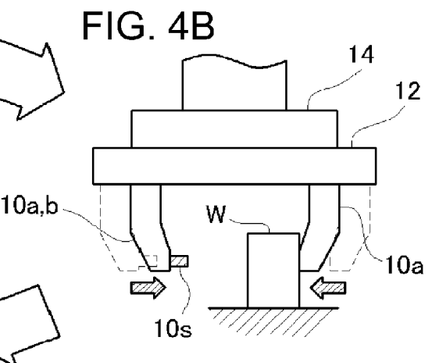

FIGS. 4A to 4E are descriptive diagrams showing how the robot hand 100 grasps the object W when the robot hand 100 is not properly positioned relative to the object W. When the robot hand 100 is not properly positioned relative to the object W and the four fingers 10 are driven to approach the object W as shown in FIG. 4A, one of the normal fingers 10*a* comes into contact with the object W before the contact sensing finger 10*b* does as shown in FIG. 4B. As a result, a reaction force exerted from the object W on the normal finger 10*a* is transmitted to the base 12 of the robot hand 100 and detected by the load cell 14. At this point, however, since the contact sensing finger 10*b* has not come into contact with the object W, the contact switch 10*s* remains turned OFF. On the other hand, when the robot hand 100 is properly positioned relative to the object W, and the load cell 14 detects a reaction force, the contact switch 10*s* is turned ON, as described with reference to FIG. 3. It is therefore determined that when the load cell 14 detects a reaction force but the contact switch 10*s* is not turned ON, the robot hand 100 has not been properly positioned relative to the object W.

In this case, the operation of driving the fingers 10 is terminated, and the position of the robot hand 100 is corrected. To correct the position of the robot hand 100, the base 12 may be moved by a predetermined fixed distance in a direction in which the load cell 14 detects the reaction force having acted thereon any more. The fingers 10 are then driven to approach the object W, and when any of the normal fingers 10*a* comes into contact with the object W before the contact sensing finger 10*b* does again (that is, when the load cell 14 detects a reaction force but the contact switch 10*s* is not turned ON), the position of the robot hand 100 is corrected again. Repeating the processes described above eventually allows the robot hand 100 to be properly positioned relative to the object W.

Alternatively, when any of the normal fingers 10*a* comes into contact with the object W before the contact sensing finger 10*b* does, the travel over which the normal finger 10*a* (or contact sensing finger 10*b*) has moved may be detected, and the position of the robot hand 100 relative to the object W may be corrected based on the detected travel. That is, when the position of the robot hand 100 relative to the object W is greatly shifted from the proper position and the object W is present in the immediate vicinity of any of the normal fingers 10*a*, the normal finger 10*a* will come into contact with the object W only by slightly moving the fingers 10. In contrast, when the position of the robot hand 100 is not greatly shifted from the proper position, the fingers 10 will need to be moved over a large distance until any of the normal fingers 10*a* comes into contact with the object W. In view of the fact described above, the amount the position of the robot hand 100 relative to the object W is shifted from the proper position can be estimated based on the travel over which the fingers 10 are moved until any of the normal fingers 10a comes into contact with the object W, and the amount of correction by which the position of the robot hand 100 relative to the object W is corrected can be estimated based on the estimated positional shift. As a result, the position of the robot hand 100 relative to the object W can be quickly corrected.

Still alternatively, the correction can be made as follows. The base 12 may first be moved in a direction in which the load cell 14 detects the reaction force having acted thereon any more, and the travel over which the base 12 has been moved until the contact sensing finger 10b comes into contact with the object W may be detected. The position of the robot hand 100 relative to the object W may then be corrected based on the detection result. Since the positional relationship between the robot hand 100 and the object W can thus be known in an accurate manner, the position of the robot hand 100 can be quickly corrected by moving the robot hand 100 to the proper position.

Figure 4C:
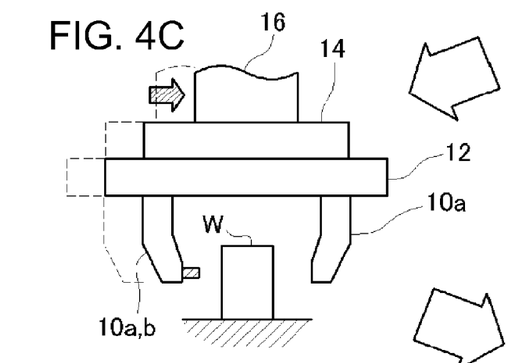
Figure 4D:
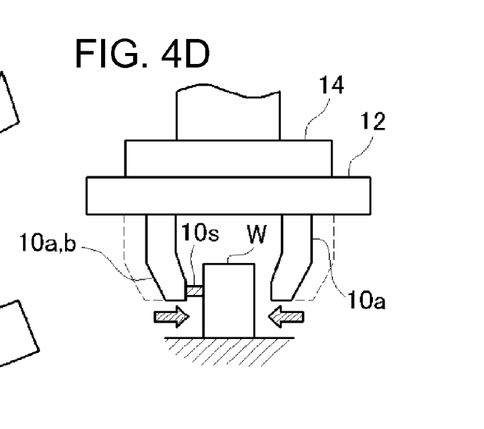
Figure 4E:
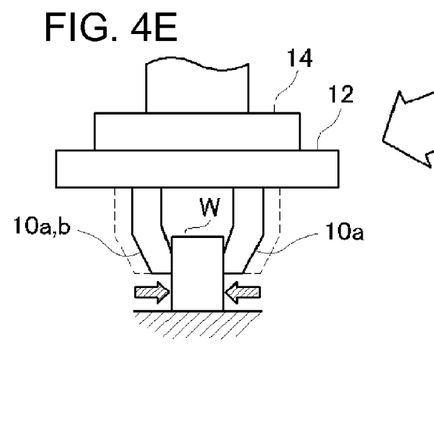

FIG. 4C shows that the position of the robot hand 100 relative to the object W has been corrected as described above. After the position of the robot hand 100 is corrected, the object W can be grasped in the exactly same manner as described above with reference to FIGS. 2A to 2C. That is, the four fingers 10 are driven under the position control until the contact sensing finger 10b comes into contact with the object W as shown in FIG. 4D, and the position control is switched to the force control when the contact sensing finger 10b comes into contact with the object W. The four fingers 10 then slowly approach the object W and eventually grasp the object W with a force of an appropriate magnitude, as shown in FIG. 4E.

Figure 5:
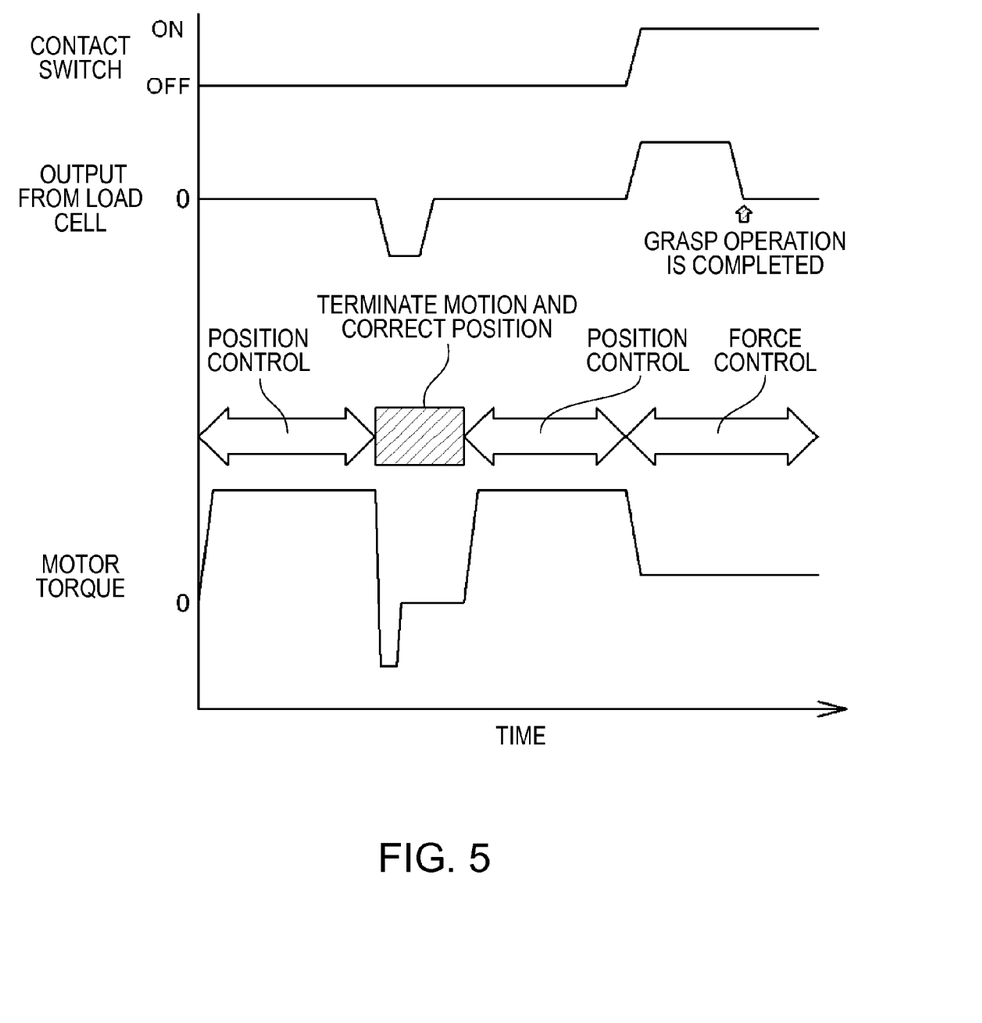
FIG. 5 is a timing chart according to which the robot hand according to the present embodiment grasps an object after the position of the hand is corrected.

FIG. 5 is a timing chart according to which the position of the robot hand 100 according to the present embodiment relative to the object W is corrected and the object W is grasped. Since the position control is performed immediately after the grasp operation starts, the drive motor for driving the pinion gear 24 produces a large torque close to a maximum rated torque so that the fingers 10 reach a target position as quickly as possible, as in the time chart shown in FIG. 3 described above. Further, since it is assumed in the present description that one of the normal fingers 10a comes into contact with the object W before the contact sensing finger 10b does, the load cell 14 detects a reaction force but the contact switch 10s of the contact sensing finger 10b remains turned OFF. The reason why the load cell 14 outputs a negative value in FIG. 5 is that the normal finger 10a facing the contact sensing finger 10b is in contact with the object W, and the load cell 14 therefore receives a reaction force in the direction opposite to the reaction force described in FIG. 3.

When the load cell 14 detects a reaction force but the contact switch 10s remains turned OFF, the operation of moving the fingers 10 is terminated. In the timing chart shown in FIG. 5, the drive motor for driving the pinion gear 24 produces a reverse torque to quickly stop the fingers 10 in motion. After the fingers 10 stop moving, the position of the robot hand 100 relative to the object W is corrected, and then the four fingers 10 are moved toward the object W again. The following procedure is the same as that shown in the timing chart described above with reference to FIG. 3. That is, when the four fingers 10 are driven to approach the object W, the contact sensing finger 10b first comes into contact with the object W and the contact switch 10s is turned ON. At this point, the method for driving the fingers 10 is switched from the position control to the force control. As a result, the four fingers 10 then slowly approach the object W. Further, when the contact sensing finger 10b comes into contact with the object W, the load cell 14 detects a reaction force. When all the four fingers 10 come into contact with the object W, the load cell 14 does not detect the reaction force any more, and the object W has been successfully grasped.

Figure 6:
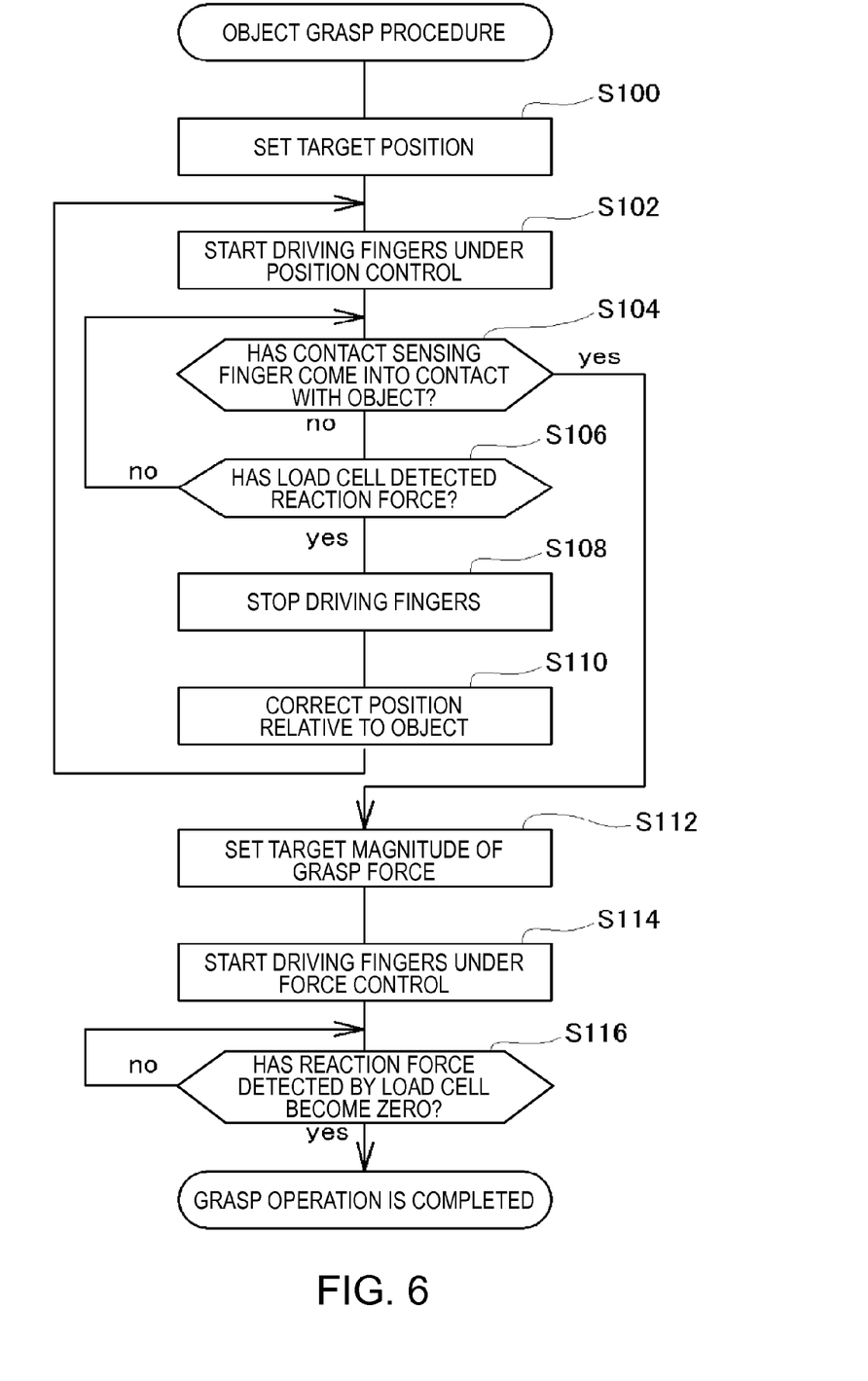
FIG. 6 is a flowchart of an object grasp procedure executed when the robot hand according to the present embodiment grasps an object.

FIG. 6 is a flowchart of an object grasp procedure executed to control the grasp operation of the robot hand 100 according to the present embodiment. The grasp operation described above with reference to FIGS. 2A to 2C, 3, 4A to 4E, and 5 is achieved by using a control circuit (not shown) that controls the overall operation of the robot hand 100 to execute the object grasp procedure shown in FIG. 6.

In the object grasp procedure, a target position to which the four fingers 10 are moved toward the object W is first set (step S100). When the size of the object W to be grasped is known, the position of the fingers 10 where they grasp the object W is set as the target position, as described above. When the size of the object W is unknown, the position of the fingers 10 where the robot hand 100 grasps the smallest graspable object W is set as the target position. To simplify the control, the target position can alternatively be fixed to the position of the fingers 10 where they grasp the smallest graspable object W.

The operation of driving the fingers 10 is then started under the position control, under which the fingers 10 can be quickly moved to the thus set target position (step S102). Since the fingers 10 are moved by rotating the pinion gear 24 in the present embodiment as described above, the torque produced by the drive motor for rotating the pinion gear 24 is controlled.

It is then determined whether or not the contact sensing finger 10b has come into contact with the object W (whether or not the contact switch 10s has been turned ON) (step S104). When the contact sensing finger 10b has not come into contact with the object W (no in step S104), it is then determined whether or not the load cell 14 has detected a reaction force (step S106). When the contact sensing finger 10b or any of the normal fingers 10a comes into contact with the object W, the load cell 14 will detect a reaction force. It can therefore be determined that none of the fingers 10 has come into contact with the object W when the load cell 14 has detected no reaction force (no in step S106). In this case, the fingers 10 keep being driven under the position control, and the control returns to the process in step S104, where it is determined again whether or not the contact sensing finger 10b has come into contact with the object W.

As the determination processes described above are repeated, the contact sensing finger 10b or any of the normal fingers 10a eventually comes into contact with the object W. The contact sensing finger 10b comes into contact with the object W before any of the normal fingers 10a does as long as the robot hand 100 is properly positioned relative to the object W, as described above.

The determination result in step S104 therefore becomes "yes," and a target magnitude of the grasp force is then set (step S112). The target grasp force used herein is a preset grasp force that does not damage the object W but allows the object W to be securely grasped when the fingers 10 are pressed against the object W. Since the fingers 10 are moved by rotating the pinion gear 24 in the present embodiment, setting the target grasp force is equivalent to setting a target torque produced by the drive motor for driving the pinion gear 24. After the operation of driving the fingers 10 is started under the force control in which the drive motor for driving the pinion gear 24 is controlled to produce the thus set target torque (step S114), it is determined whether or not the load cell 14 does not detect the reaction force having acted thereon any more (step S116). When the load cell 14 is still detecting a reaction force (no in step S116), the grasp operation is not completed (four fingers 10 have not come into contact with object W). In this case, the force control keeps being performed. In the course of the force control, all four fingers 10 eventually come into contact with the object W and the load cell 14 does not detect the reaction force having acted thereon any more (yes in step S116). The object grasp procedure shown in FIG. 6 is terminated at this point. After the object grasp procedure is terminated, the fingers 10 remain pressed against the object W with the target grasp force to keep holding the grasped object W.

The above description has been made of the case where the robot hand 100 is properly positioned relative to the object W and the contact sensing finger 10b comes into contact with the object W before any of the normal fingers 10a does (the case where the determination result in step S104 is "yes"). In contrast, when any of the normal fingers 10a comes into contact with the object W before the contact sensing finger 10b does, the determination result in step S106 becomes "yes," and the operation of driving the fingers 10 is terminated (step S108). At this point, the drive motor for driving the pinion gear 24 may produce a reverse torque to quickly stop the fingers 10 in motion (see FIG. 5).

The position of the robot hand 100 relative to the object W is then corrected (step S110). To correct the position, either the robot hand 100 or the object W may be moved. The robot hand 100 (or object W) is moved in a direction in which the load cell 14 does not detect the reaction force having acted thereon any more. The travel of the robot hand 100 (or object W) in this process may be a preset fixed value or may be estimated by using any of the methods described above (the method using the travel of the fingers 10 detected until the load cell 14 detects a reaction force or the method using the travel over which the base 12 has moved until the contact sensing finger 10b comes into contact with the object W).

After the position of the robot hand 100 relative to the object W is corrected as described above (step S110), the operation of driving the fingers 10 is started again under the position control (step S102). The fingers 10 keep being driven under the position control until the contact sensing finger 10b comes into contact with the object W (yes in step S104) or the load cell 14 detects a reaction force (yes in step S106). As a result, when the load cell 14 detects a reaction force (yes in step S106), the operation of driving the fingers 10 is terminated again and the position of the robot hand 100 is corrected (steps S108 and S110), and the operation of driving the fingers 10 is started again under the position control (step S102). On the other hand, when the contact sensing finger 10b comes into contact with the object W (yes in step S104), a target grasp force is set as described above (step S112), and then the fingers 10 are driven under the force control in which the set target grasp force is achieved (step S114). When the load cell 14 does not detect the reaction force having acted thereon any more (yes in step S116), it is determined that the object W has been successfully grasped, and the object grasp procedure shown in FIG. 6 is terminated.

The robot hand 100 according to the present embodiment can quickly grasp the object W with a force of an appropriate magnitude by executing the procedure described above. Further, even when the robot hand 100 is not properly positioned relative to the object W, the robot hand 100 can appropriately grasp the object W by correcting the position of the robot hand 100.

C. Variations

There are several variations of the embodiment described above. Some of these variations will be briefly described below. The description of the variations will be made of differences from the embodiment described above, and no description will be made of the same components as those in the embodiment described above.

The contact sensing finger 10b in the above embodiment has been described with reference to the case where the contact switch 10s is provided at the portion that comes into contact with the object W. The contact sensing finger 10b can, however, be configured differently as long as it comes into contact with the object W before any of the normal fingers 10a does and does not exert a force large enough to damage the object W at least until some of the normal fingers 10a comes into contact with the object W.

Figure 7A:
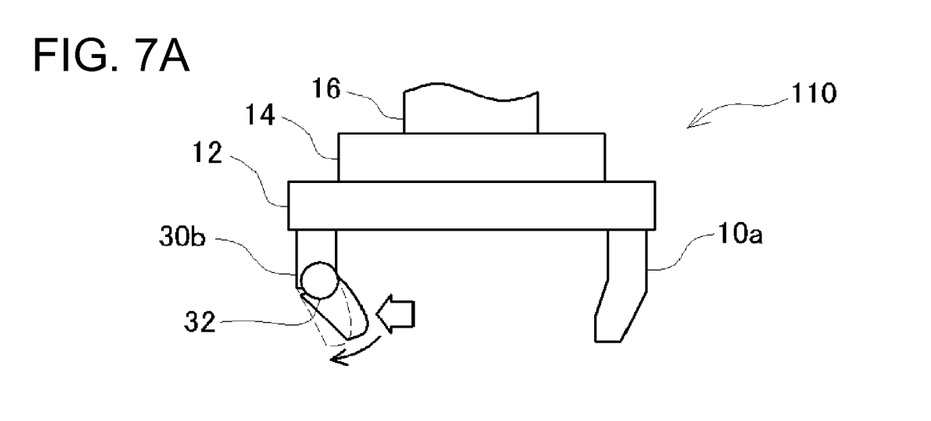
FIGS. 7A to 7C are descriptive diagrams showing robot hands according to variations provided with contact sensing fingers according to other aspects.
Figure 7B:
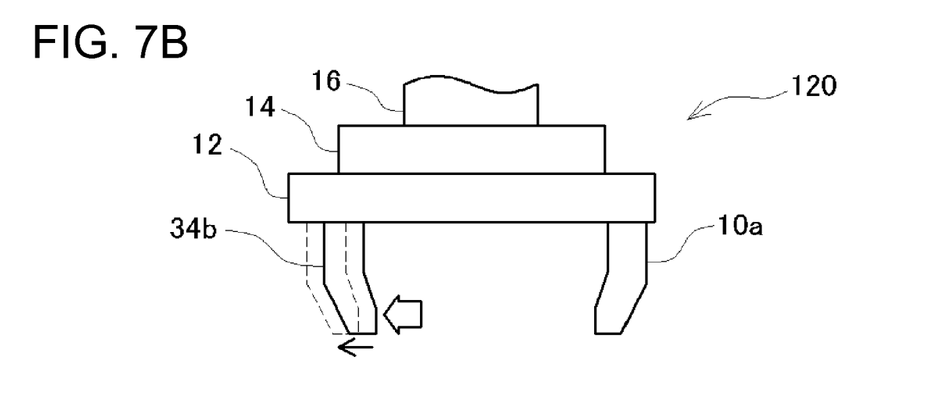
Figure 7C:
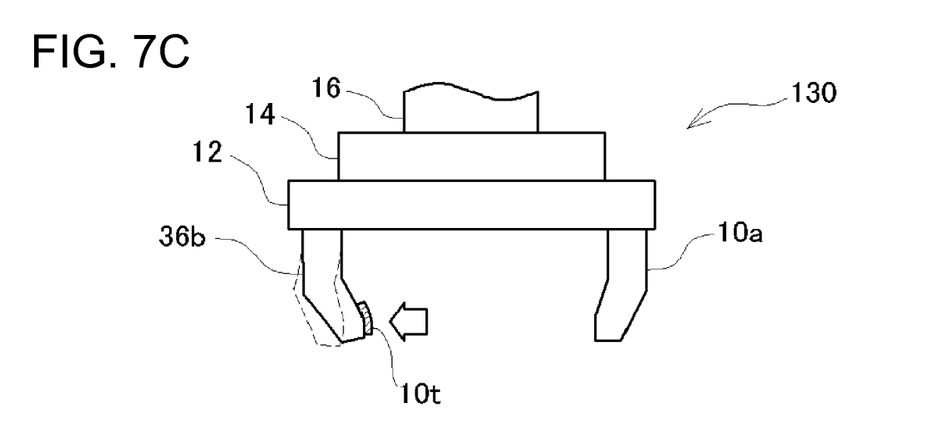

FIGS. 7A to 7C are descriptive diagrams showing robot hands according to a variety of variations provided with contact sensing fingers according to other aspects. FIG. 7A shows a robot hand 110 according to a variation in which a contact sensing finger 30b is configured to bend at a joint 32. The contact sensing finger 30b is urged by a spring built in the joint 32 and bent inward in an initial state. When the contact sensing finger 30b comes into contact with an object W, and a reaction force from the object W causes the contact sensing finger 30b to pivot about the joint 32 slightly outward, a contact switch (not shown) provided in the joint 32 is turned ON. Thereafter, the contact sensing finger 30b may further pivot about the joint 32 outward and deform as the contact sensing finger 30b approaches the object W.

FIG. 7B shows a robot hand 120 according to another variation in which the entirety of a contact sensing finger 34b attached to the base 12 (attached to movable member 20, in practice) is configured to slide. The contact sensing finger 34b is urged by a spring and slides inward in an initial state. When the contact sensing finger 34b comes into contact with an object W and a reaction force from the object W causes the contact sensing finger 34b to slide slightly outward, a contact switch (not shown) provided in the base 12 is turned ON. Thereafter, the contact sensing finger 34b may further slide outward as the contact sensing finger 34b approaches the object W.

FIG. 7C shows a robot hand 130 according to another variation in which a contact sensing finger 36b is formed of an elastic member that relatively readily deforms, and a pressure sensor 10t is provided at a portion that comes into contact with an object W. When the contact sensing finger 36b comes into contact with the object W, the pressure sensor 10t provides an output representing that contact has been detected. Thereafter, the entire contact sensing finger 36b may deform as the contact sensing finger 36b approaches the object W.

Figure 8:
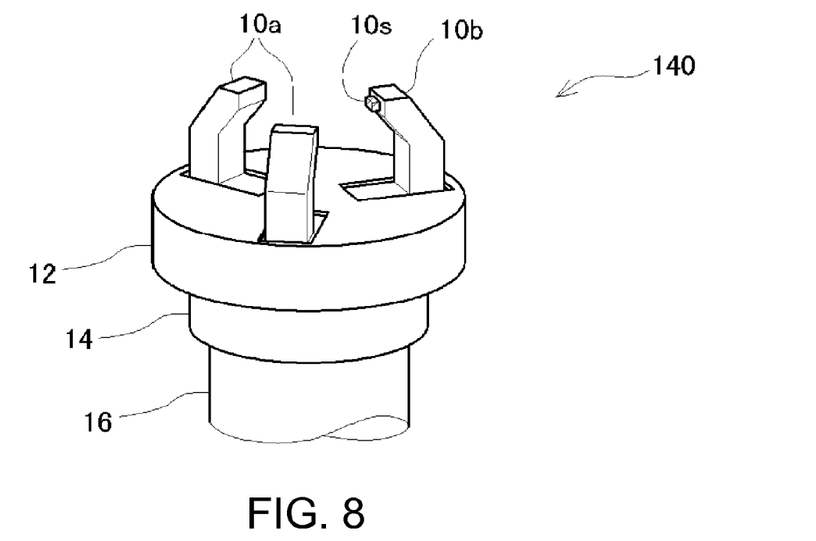
FIG. 8 is a descriptive diagram showing a robot hand according to another aspect of a variation.

The above embodiment and variations have been described by assuming that a plurality of fingers 10 are paired and the paired fingers face each other. The plurality of fingers 10 are not necessarily configured so that they are paired and the paired fingers face each other but may be disposed so that they face the center of the robot hand, for example, as shown in FIG. 8.

D. Application Example

Figure 9:
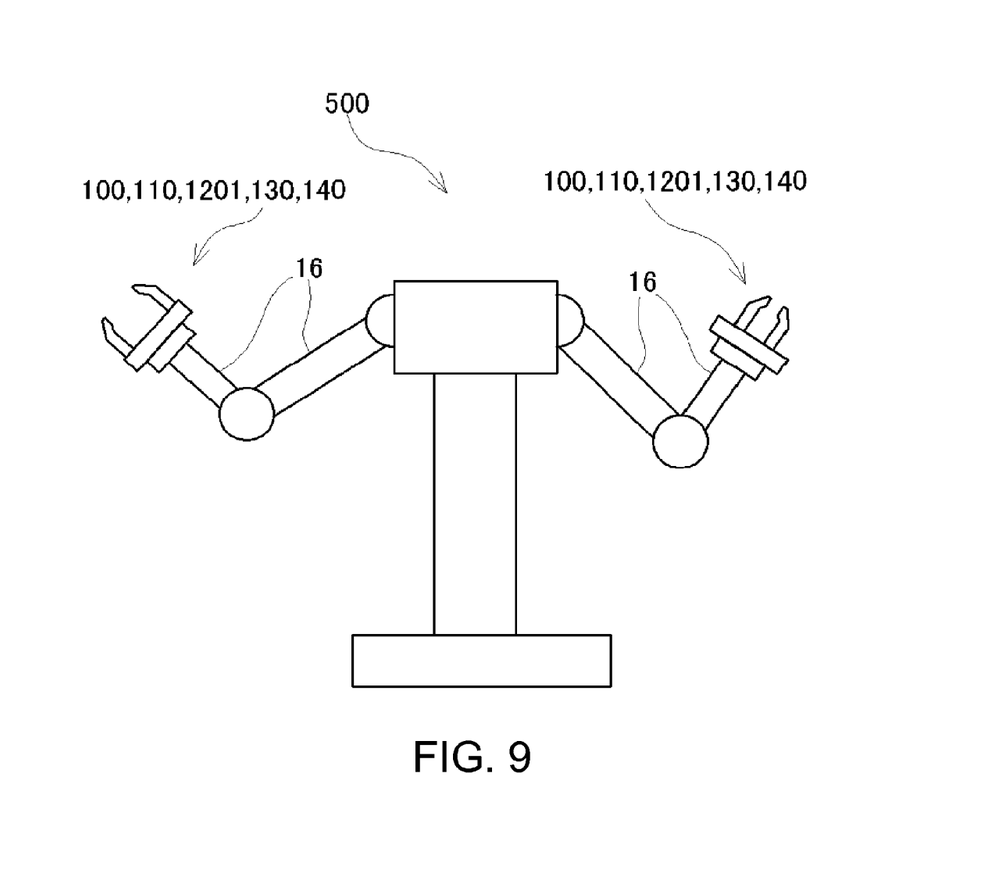
FIG. 9 is a descriptive diagram showing a robot provided with the robot hand according to the present embodiment.

The robot hands 100, 110, 120, and 130 according to the embodiment and the variations can quickly grasp an object W with a force of an appropriate magnitude, have simple structures, and can be readily controlled, as described above. Incorporating any of the robot hands 100, 110, 120, and 130 according to the embodiment and the variations in a robot 500 therefore allows the robot 500 to quickly grasp the object W with a force of an appropriate magnitude, have a simple structure, and be readily controlled, as shown in FIG. 9.

The robot hands and the robot according to the present embodiment have been described above. It is, however, noted that the invention is not limited to the embodiment described above and a variety of aspects of the invention can be implemented without departing from the substance and scope of the invention.

The entire disclosure of Japanese Patent Application No. 2011-105007 filed May 10, 2011 is expressly incorporated by reference herein.

What is claimed is:

1. A robot hand that includes a plurality of fingers and a base provided with the plurality of fingers and grasps an object by using the plurality of fingers, the robot hand comprising:
   a resultant reaction force detector that detects a resultant reaction force that is a combination of reaction forces exerted by the plurality of fingers on the base; and
   a finger driver that drives the plurality of fingers to approach the object or move away from the object,
   wherein the plurality of fingers include a contact sensing finger that senses contact with the object, and
   the finger driver
      moves the plurality of fingers toward the object when the resultant reaction force is not detected and the contact sensing finger does not sense the contact, and
      switches a force that drives the plurality of fingers to a force corresponding to a grasp force exerted to grasp the object when the contact sensing finger senses the contact, and
   wherein, when the contact sensing finger does not sense the contact but the resultant reaction force is detected, the driving of the plurality of fingers is stopped, the position of the base is changed by moving the base in a direction in which the resultant reaction force is not detected any more, and the plurality of fingers are again moved toward the object.

2. The robot hand according to claim 1,
   wherein the contact sensing finger deforms when a reaction force smaller than the grasp force is exerted thereon by the object.

3. A robot comprising a robot hand, the robot hand includes a plurality of fingers and a base provided with the plurality of fingers and grasps an object by using the plurality of fingers, the robot hand comprising:
   a resultant reaction force detector that detects a resultant reaction force that is a combination of reaction forces exerted by the plurality of fingers on the base; and
   a finger driver that drives the plurality of fingers to approach the object or move away from the object,
   wherein the plurality of fingers include a contact sensing finger that senses contact with the object, and
   the finger driver moves the plurality of fingers toward the object when the resultant reaction force is not detected and the contact sensing finger does not sense the contact, and
   switches a force that drives the plurality of fingers to a force corresponding to a grasp force exerted to grasp the object when the contact sensing finger senses the contact, and
   wherein, when the contact sensing finger does not sense the contact but the resultant reaction force is detected, the driving of the plurality of fingers is stopped, the position of the base is changed by moving the base in a direction in which the resultant reaction force is not detected any more, and the plurality of fingers are again moved toward the object.

4. The robot of claim 3, wherein the contact sensing finger deforms when a reaction force smaller than the grasp force is exerted thereon by the object.

5. A method of controlling a robot hand that includes a plurality of fingers and a base provided with the plurality of fingers and grasps an object by using the plurality of fingers, the method comprising:
   providing the plurality of fingers with a contact sensing finger that senses contact with the object,
   detecting a resultant reaction force that is a combination of reaction forces exerted by the plurality of fingers on the base; and
   driving the plurality of fingers to approach the object or move away from the object,
   the driving step including:
      moving the plurality of fingers toward the object when the resultant reaction force is not detected and the contact sensing finger does not sense the contact, and
      switching a force that drives the plurality of fingers to a force corresponding to a grasp force exerted to grasp the object when the contact sensing finger senses the contact, and
   wherein, when the contact sensing finger does not sense the contact but the resultant reaction force is detected:
      stopping the driving of the plurality of fingers;
      changing the position of the base by moving the base in a direction in which the resultant reaction force is not detected any more; and
      thereafter moving the plurality of fingers toward the object.

* * * * *